(12) United States Patent
Yoshihiro

(10) Patent No.: US 7,092,192 B1
(45) Date of Patent: Aug. 15, 2006

(54) VIDEOTAPE RECORDING AND PLAYBACK DEVICE, AND VIDEOTAPE PLAYER

(75) Inventor: Mitsugu Yoshihiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 118 days.

(21) Appl. No.: 09/889,546

(22) PCT Filed: Nov. 22, 2000

(86) PCT No.: PCT/JP00/08240

§ 371 (c)(1),
(2), (4) Date: Jul. 18, 2001

(87) PCT Pub. No.: WO01/39496

PCT Pub. Date: May 31, 2001

(30) Foreign Application Priority Data

Nov. 22, 1999 (JP) ................................. 11-330980

(51) Int. Cl.
*G11B 5/09* (2006.01)
(52) U.S. Cl. ...................................... 360/73.06; 360/70
(58) Field of Classification Search ............. 360/73.04, 360/73.08, 73.01, 13, 64; 386/78
See application file for complete search history.

(56) References Cited

U.S. PATENT DOCUMENTS

| | | | |
|---|---|---|---|
| 5,311,375 A * | 5/1994 | Ikushima et al. ............. 360/64 |
| 5,349,479 A * | 9/1994 | Arimura et al. ......... 360/73.06 |
| 5,432,769 A | 7/1995 | Honjo .......................... 360/60 |
| 5,802,243 A * | 9/1998 | Yao et al. ...................... 386/78 |
| 5,907,656 A * | 5/1999 | Oguro .......................... 386/94 |
| 5,943,468 A * | 8/1999 | Takayama ................... 386/113 |
| 5,956,458 A * | 9/1999 | Sezan et al. .................. 386/95 |
| 5,959,800 A | 9/1999 | Hartung et al. |
| 5,969,897 A * | 10/1999 | Morita ..................... 360/73.01 |

(Continued)

FOREIGN PATENT DOCUMENTS

EP       0 689 354       12/1995

(Continued)

OTHER PUBLICATIONS

Patent Abstracts of Japan, vol. 014, No. 561 (P-1142), Dec. 13, 1990 & JP 02 240867 A (Sharp Corp), Sep. 25, 1990.

(Continued)

*Primary Examiner*—Thang V. Tran
*Assistant Examiner*—Varsha A. Kapadia
(74) *Attorney, Agent, or Firm*—Frommer Lawrence & Haug LLP; William S. Frommer; Thomas F. Presson

(57) ABSTRACT

The object of the present invention is to reduce the load and specification requirements on the network and the video server. The buffer usage rate is counted and supplied to the tape driving controller 7. In the reproduction mode, the tape driving controller 7 decreases the running speed of a video tape when the buffer usage rate is larger than the proper value. And when the buffer usage rate is smaller than the proper value, the tape driving controller 7 increases the running speed of the video tape. Moreover, in the recording mode, the tape driving controller 7 stops the tape motion temporarily if the transmission speed of the network is slow and the buffer usage rate declines lower than the proper value. And if the buffer usage rate increases over the proper value, the tape driving controller 7 resumes the tape driving to record signals. Thus, the reproduction speed or the recording speed by the tape driving device 3 can be coincided with the transmission speed of the network.

8 Claims, 5 Drawing Sheets

U.S. PATENT DOCUMENTS

| | | | | |
|---|---|---|---|---|
| 5,971,281 | A | * | 10/1999 | Frary et al. ................ 235/487 |
| 6,134,067 | A | * | 10/2000 | Nakajima et al. ............ 360/69 |
| 6,182,191 | B1 | * | 1/2001 | Fukuzono et al. ........... 711/111 |
| 6,304,410 | B1 | * | 10/2001 | Kita et al. .................... 360/84 |
| 6,307,701 | B1 | * | 10/2001 | Beavers et al. ......... 360/73.08 |

FOREIGN PATENT DOCUMENTS

| EP | 0 700 206 | 3/1996 |
|---|---|---|
| JP | 50-94907 | 7/1975 |
| JP | 4-318786 | 11/1992 |
| JP | 6-150468 | 5/1994 |
| JP | 7-45051 | 2/1995 |
| JP | 10-308065 | 11/1998 |
| JP | 11-88831 | 3/1999 |
| JP | 2000-217080 | 8/2000 |
| WO | WO 98 34229 | 8/1998 |
| WO | WO 98/50919 | 11/1998 |

OTHER PUBLICATIONS

Patent Abstracts of Japan, vol. 1996, No. 04 (P-1142), Apr. 30, 1996 & JP 07 336640 A (Hitachi Ltd), Dec. 22, 1995.

Patent Abstracts of Japan, vol. 017, No. 335 (P-1563), Jun. 24, 1993 & JP 05 041068 A (Matsushita Electric Ind. Co. Ltd.), Feb. 19, 1993.

Patent Abstracts of Japan, vol. 015, No. 322 (P-1239), Aug. 16, 1991 & JP 03 116571 A (Canon Inc), May. 17, 1991.

* cited by examiner

US 7,092,192 B1

VIDEOTAPE RECORDING AND PLAYBACK DEVICE, AND VIDEOTAPE PLAYER

TECHNICAL FIELD

The present invention relates to a video tape recording/reproducing device for recording video data on a video tape and reproducing the video data recorded on the video tape.

BACKGROUND ART

In recent years, video servers (or AV (audio and video) servers) which perform nonlinear recording and reproduction by using a random accessable recording medium have come into widespread use in place of sequential (linear) recording and reproduction using a VTR tape. In general, in order to comply with demands for high image quality and sound quality, a video server employed as an equipment in the broadcasting station is required to achieve a high data transfer rate and a large storage capacity for enabling long-time data recording. Thus, material data composed of a plurality of audio-video data are dispersely recorded by using the RAID (Redundant Arrays of Inexpensive Disks) which is comprised of multiple hard disks adapted for time-division recording and reproduction and performs multi-channel simultaneous transmission or multi-channel reproduction of the same material data with lag of the reproduction time. And thereby so-called VOD (video on demand) and NVOD (near video on demand) have been realized.

The video server mentioned above is connected to some other equipment (editor, player, etc) via a network such as LAN (Local Area Network), and provides the audio-video data recorded in a storage device such as a hard disk via said network, or records the audio-video data obtained from an external equipment such as a video tape recording/reproducing device using the VTR tape as a recording medium.

In the case of recording the audio-video data on the video tape in the memory device of the video server mentioned above, it is necessary to receive the video output from the video tape recording/reproducing device and to convert the video output into a file recordable in the video server. Accordingly, it becomes necessary that the video server is equipped with a VTR control system, a video capture circuit and a function of conversion into a file. Furthermore, since the audio-video data from the video tape recording/reproducing device are entered into the video server at a fixed speed, it is requisite that in order to capture the audio-video data, all of the data receiving circuit, the file transferring network and the memory device of the video server for storing the file should keep operating continuously at a fixed transfer speed respectively without any interruption. Consequently, there have been problems in the conventional system, including that the cost is increased and the specification requirements relative to the network and the storage device of the video server are rendered stricter.

Furthermore, in the video tape recording/reproducing device according to the conventional technology, if the audio-video data are to be transmitted at a slow speed asynchronous transmission, the audio-video data are written in the external memory device such as the hard disk at the fixed speed once and then the data are transmitted asynchronously from the hard disk. And such external memory devices have led to the cost increase.

Moreover, in the video tape recording/reproducing device, since it becomes necessary to have a list of files in advance in order to transfer the file to the other terminal on the network. However, in the video tape recording/reproducing device, since the video tape is a sequential access recording medium, it took time for forming, detecting and referring to such list.

DESCRIPTION OF THE INVENTION

It is therefore an object of the present invention to provide a video tape recording/reproducing device capable of alleviating the specification requirements and diminishing the load on the network and the video server.

In order to achieve the object mentioned above in recording the video data on a video tape and reproducing the video data recorded on the video tape, the video tape recording/reproducing device according to the present invention defined in claim 1, comprises a driving means for executing reproduction and recording of the video data while moving the video tape at the predetermined running speed; a buffer memory for temporarily holding the video data to be reproduced by said driving means or the video data to be recorded; an interface for asynchronously transferring the video data between the external equipment and the buffer memory; and a driving control means for controlling the running speed of video tape by said driving means according to the quantity of data stored in said buffer memory.

Moreover, as a preferred embodiment such as described in Claim 2, in the video tape recording/reproducing device according to Claim 1, the driving control means controls the running speed of said video tape by said driving means, and when the data quantity stored in the buffer memory is larger than the proper value, it controls said driving means to lower the running speed of said video tape. While, when the data quantity stored in the buffer memory is smaller than the proper value, it controls said driving means to increase the running speed of said video tape.

Furthermore, as another preferred embodiment, such as described in Claim 3, in the video tape recording/reproducing device according to Claim 1, said driving control means controls the driving means so that the motion of the video tape is brought to a stop temporarily when the quantity of data stored in the buffer memory is dropped lower than the proper value, and afterwards, when the quantity of data stored in the buffer memory is increased over the proper value, the motion of the video take is resumed to restart the recording on the video tape.

Furthermore, as another preferred embodiment, such as described in Claim 4, in the video tape recording/reproducing device according to Claim 3, said driving control means controls said driving means so that said video tape is returned by the fixed distance in the opposite direction so as to be ready for restarting the next recording after the motion of the video tape is temporarily brought to a stop.

As a further preferred embodiment, such as described in Claim 5, the video tape recording/reproducing device according to Claim 1, comprises a memory read and write means for reading out the contents memorized in the memory means attached to said video tape to memorize the information that controls the contents recorded on said video tape and for conducting the write-in, and receives/transmits the management information to be memorized by the memory means via the interface.

In order to achieve said object, the video tape reproducing device for reproducing the video data recorded on the video tape, according to the invention described in Claim 6, comprises a driving means for reproducing the video data by moving said video tape at the predetermined running speed, an interface for synchronously transferring the video data between the buffer memory in which the video data to be reproduced by said driving means is temporarily stored, and a driving control means for controlling the running speed of said video tape by said driving means according to the quantity of data stored in said buffer memory.

Furthermore, as another preferred embodiment such as described in Claim 7, the video tape reproducing device according to Claim 6, wherein said driving control means controls the running speed of said video tape by said driving means, and controls said driving means so that when the data quantity stored in said buffer memory is larger than the proper value, the video tape running speed is lowered, while when the data quantity stored in said buffer memory is smaller than the proper value, the video tape running speed is increased.

Moreover, as another preferred embodiment such as described in Claim 8, the video tape reproducing device according to Claim 6, comprises a memory read-out means for reading out the memorized contents of the memory means attached to said video tape in order to memorize the information to control the contents recorded on said video tape; and outputs management information stored in the memory means via the interface.

According to the present invention, the video data to be reproduced while the video tape is being moved by the driving means are stored temporarily in the buffer memory and then delivered to an external equipment via the interface. Or the video data put in from the external equipment via the interface are stored temporarily in the buffer memory and then the video data are recorded on the video tape to be moved by the driving means. At this point, the driving control means controls the video tape transfer rate by said driving means in accordance with the data quantity stored in the buffer memory. Accordingly, the reproduction/recording of the video data can be performed by automatic adjusting the tape driving speed according to the transmission speed of the network without using any external memory device such as a hard disk. Thereby, it becomes possible to alleviate the specification requirements and diminish the load of the network and the video server.

BEST MODE FOR CARRYING OUT THE INVENTION

With reference to the accompanying drawings an embodiment of the present invention will be described in detail in the following paragraphs.

A. CONSTRUCTION OF EMBODIMENT

Figure 1:
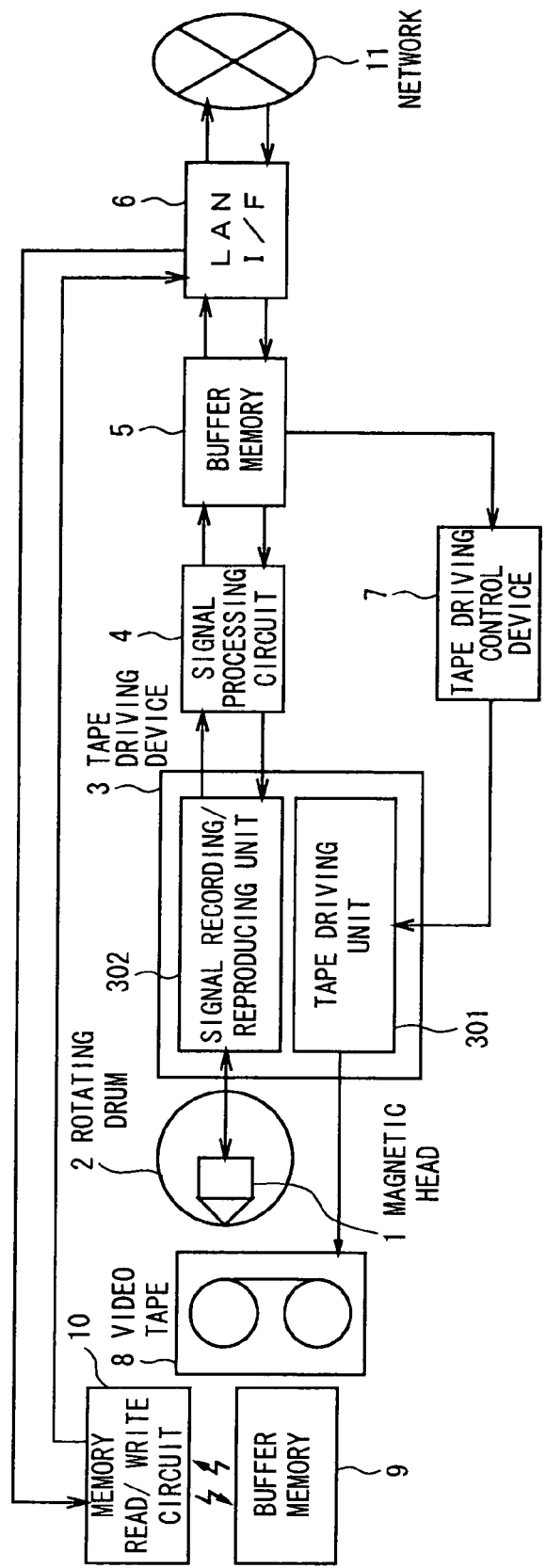
FIG. 1 is a block diagram showing the construction of a tape recording/reproducing device according to the embodiment of the present invention.

FIG. 1 is a block diagram showing the construction of a video tape recording/reproducing device according to the embodiment of the present invention. In FIG. 1, a tape driving device 3 comprises a tape driving unit 301 for driving the running of the video tape 8 and a signal recording/reproducing unit 302 for conducting the recording and/or reproduction of audio-video data onto the video tape 8 by means of a magnetic head 1 placed on the rotation drum 2. This tape driving device 3 runs the video tape 8 at the running speed under the control of the tape driving controller 7 and records/reproduces the audio-video data.

The tape driving unit 301 of the tape driving device 3 drives the rotation of a supply reel motor to rotate the supply reel of the video tape 8, a take-up reel motor to rotate and drive the take-up reel, and a capstan motor for rotating/ driving the capstan which is attached to the video tape 8 and moves the video tape 8 under the control of the tape driving controller 7 so that the video tape 8 runs at the same speed of the recording time of the speed becomes larger than the recording time from the stop. In this connection, the video tape 8 is driven by the tape driving unit 301 in both directions, i.e., in the same tape running direction as in the recording mode (forward direction running) and in the opposite direction to the recording mode time (reverse direction running).

In the recording mode, the signal recording/reproducing unit 302 of the tape driving device 3 adds error correction codes to the signal by applying the error correction coding using the Reed-Solomon coding to the signal from the signal processing circuit 4. Furthermore, the signal recording/ reproducing unit 302, after adding sync data and ID data to said signal, forms channel coded serial data, and records this on the video tape 8 by means of the magnetic head 1.

Furthermore, in the reproduction mode, applying the opposite processing to the recording mode onto the video data read out by the magnetic head 1, the signal recording/ reproducing unit 302 transmits the video data of which errors are corrected to the signal processing circuit 4.

Figure 2:
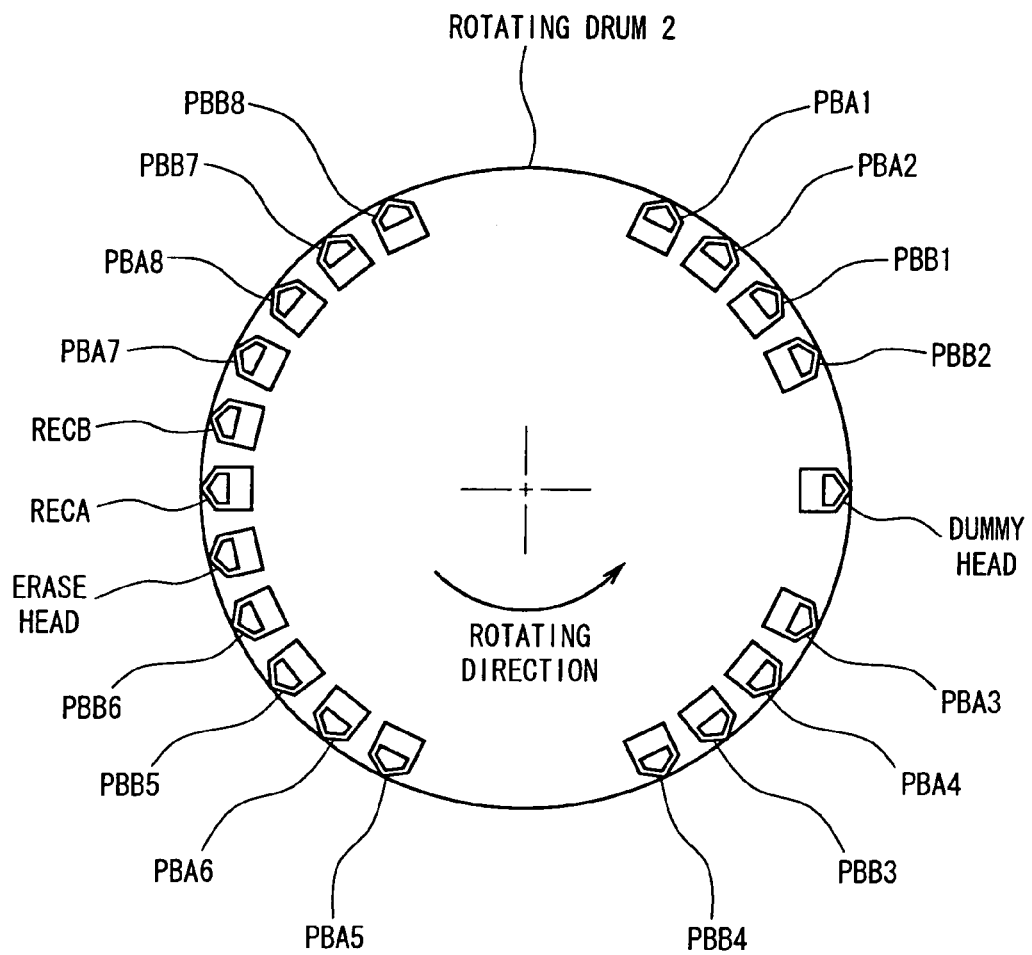
FIG. 2 is a diagram showing the layout of a magnetic head on the rotation drum according to the embodiment of the present invention.

FIG. 2 shows the construction of a magnetic head 1 placed in the signal recording/reproducing unit 302 of the tape driving device 3. The magnetic head 1 comprises a pair of recording heads having different azimuths each other RECA, RECB, and reproduction heads of which azimuths conform to the recording heads RECA, RECB; PBA1, PBA2, PBA3, PAB4, PBA5, PBA6, PBA7, PBA8, PBB1, PBB2, PBB3, PBB4, PBB5, PBB6, PBB7, PBB8, and an erase head EH and a dummy head DH. These heads are placed on the rotation drum 2 respectively.

In magnetic heads 1, PBAs and PBBs of the reproduction head are combined as a pair, such as (PBA1 and PBA2, PBA3 and PBA4, PBA5 and PBA6, PBA7 and PBA8 corresponding to the track having the azimuth A, and PBB1 and PBB2, PBB3 and PBB4, PBB5 and PBB6, PBB7 and PBB8 corresponding to the track with the azimuth B), and are arranged.

In these pairs of reproduction heads, the heads attached with odd numbers are the preceding side of the drum rotating direction, and the heads attached with even numbers are the succeeding side. The head of the preceding side and the head of the succeeding side are separated for one track, i.e., these are placed at intervals of one track pitch. Because of such head arrangement, the tape driving device 3 can conduct the variable-speed reproduction.

Figure 3:
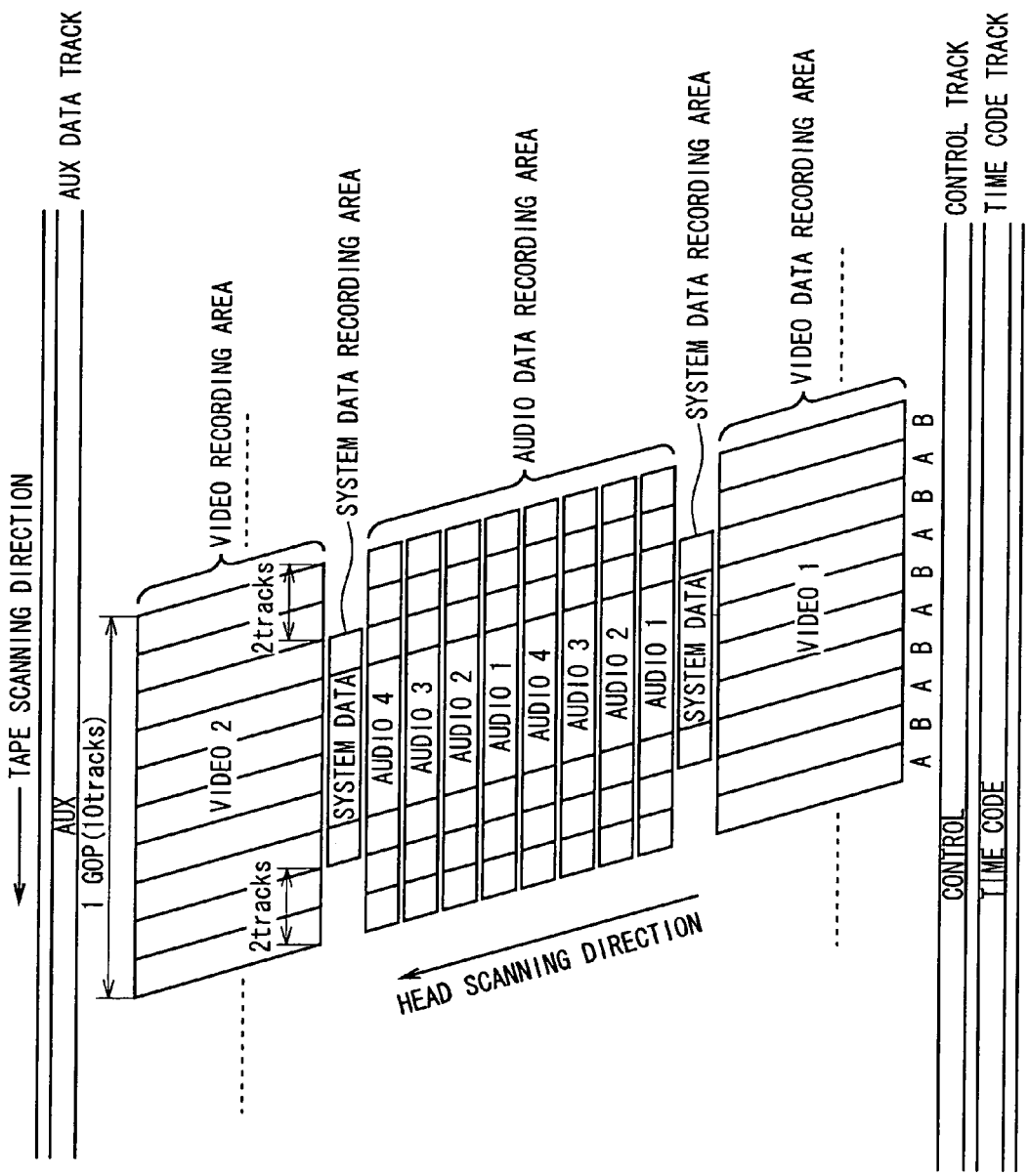
FIG. 3 is a diagram showing the recording pattern formed on the video tape by the magnetic head according to the embodiment of the present invention.
Figure 4:
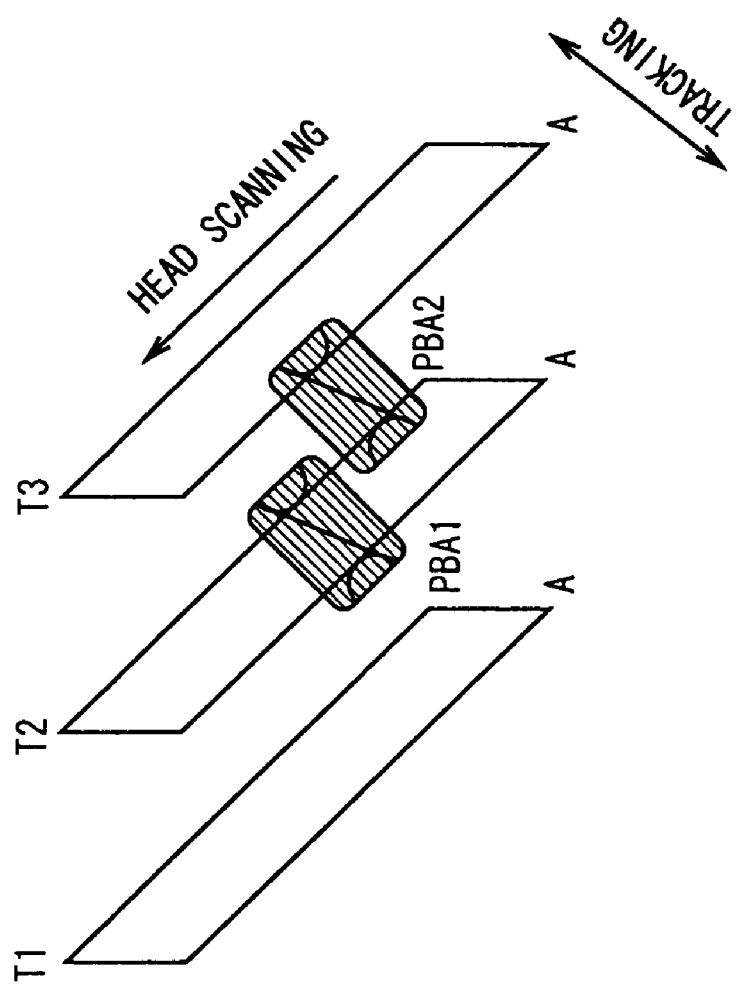
FIG. 4 is a diagram showing the trackings by 2 reproduction magnetic heads according to the embodiment of the present invention.

FIG. 3 shows a recording pattern formed on the video tape 8 by means of the tape driving device 3. The video data to be recorded is an example of the 525/60 television signal system.

The track with the azimuth A is formed by the recording head RECA, and the track with the azimuth B is formed by the recording head RECB.

Video data are recorded in the video recording areas VIDEO 1, 2, and audio data are recorded in the audio recording areas AUDIO 1, 2, 3, 4. And SYSTEM DATA are recorded in two system data recording areas respectively.

In this connection, the compression coding according to the MPEG2 is conducted in the signal processing circuit 4, and the signal recording/reproducing unit 302 records the video data to be formed by the compression coding on 10 tracks per 1 GOP.

Moreover, the auxiliary data are recorded on the AUX data track of the longitudinal track on the video tape 8, and control signal to be used for the tape running servo is recorded on the control track, and the time code that is the position information of video data recorded is recorded on the time code track.

Incidentally, the tape driving device 3 can reproduce the video tape 8 at the tape running speed by the control of the tape driving controller 7, i.e., can conduct the variable-speed reproduction. This variable-speed reproduction is not the method to displace the reproduction head in the direction orthogonal to the head scanning direction corresponding to the increase or decrease of the tape running speed and to track, nor the method to track changing the rotating speed of the rotation drum corresponding to the increase or decrease of the tape running speed, but is the method of non-tracking to be described in the following paragraphs and all data on the track can be reproduced even in the variable-speed reproduction.

The disposition of the reproduction head and the head scanning condition will be shown in FIG. 14. Two reproduction heads (PBA1 and PBA2 in Fig.) with the same azimuth as a track (the track T2 with the azimuth A in Fig.) are provided on said track having the distance for one track between. In the variable-speed reproduction mode, even if trackings of these 2 heads are separated, one of these 2 heads always compensates the other. Thus, a pair of reproduction heads can reproduce all data on the track regardless where they are on the track.

The tape driving device 3 possesses 4 sets of pair of reproduction heads for tracks of azimuth A and B respectively. Thus, the tape driving device 3 can conduct the variable-speed reproduction with the tape running speed of 0 to +4 times of the recording mode under the control of the tape driving controller 7. In this connection, the running speed range in which variable-speed reproduction can be conducted can be changed by providing the fixed number of reproduction head pairs. In the reproduction mode, the signal processing circuit 4 supplies audio-video data from the tape driving device 3 to the buffer memory 5 after compressing the audio-video data according to the known MPEG2 high efficiency coding method. On the other hand, in the recording move, the signal processing circuit 4 supplies the audio-video data stored in the buffer memory 5 to the tape driving device 3.

In a reproduction mode, the buffer memory 5 stores the compressed audio-video data supplied from the signal processing circuit 4. Meanwhile in a recording mode, the buffer memory 5 stores the audio-video data supplied from an external equipment via a LAN interface 6. The buffer memory 5 has a function of counting the rate of the data quantity to the entire memory capacity (hereinafter referred to as buffer usage rate) and sending this rate to the tape driving controller 7. The LAN interface 6 sends the audio-video data stored in the buffer memory 5 to the external equipment connected on the network, while it supplies the audio-video data from the external equipment to the buffer memory 5. Since the MPEG system is adopted for data compression, data will be handled in units of GOP (Group of Pictures) in each block.

The tape driving controller 7 controls the tape driving speed of the tape driving device 3 in accordance with the buffer usage rate in order to move the buffer usage rate closer to the proper value. More specifically, when the buffer usage rate is larger than the proper value in the reproduction mode, the tape driving controller 7 lowers the tape driving speed corresponding to the excess and the time change rate thereof. On the other hand, if the buffer usage rate is smaller than the proper value, the tape driving controller 7 controls the tape driving device 3 to increase the tape driving speed corresponding to the deficiency and the time change rate thereof. In the recording mode, the tape driving controller 7 stops the tape driving temporarily when the buffer usage rate becomes lower than the proper value, and then returns the tape by the fixed distance in the opposite direction so as to be ready for restarting the next recording. While, if the buffer usage rate becomes larger than the proper value, the tape driving controller 7 controls the tape driving device 3 to resume the tape driving and restart recording on the video tape.

The buffer memory 9 is a memory in which a list of video contents recorded on the video tape 8 is recorded, and this memory is provided in the cassette in which the video tape 8 is stored. The list information of the buffer memory 9 is read/written by the memory read/write rotation 10 and is received between other equipment connected to the network 11 via the LAN interface 6.

B. OPERATION OF EMBODIMENT

Next, the operation of the embodiment described above will be explained in the following paragraphs.

Firstly, the operation in the case of reproducing the contents of video tape and transmitting via the LAN interface 6 will be explained. When the video tape is reproduced by the tape driving device 3, signals read in (audio-visual signals) are supplied to the signal processing circuit 4 and outputted as compressed video signals. At this point, even if the video tape is driven more slowly than in the recording mode and the magnetic head 1 is kept scanning the same recording track on the video tape repeatedly, the signal processing circuit 4 would not output the same signal twice or more.

In the signal processing circuit 4, the audio-video data are transmitted collectively in units of GOP to the buffer memory 5. Since in the tape driving device 3 the data of each GPO are recorded in a plurality of helical tracks as long as the video tape is moving in the same direction, the data of the same GOP would not be put out twice even if the running speed is slow. Thus, the compressed video signals reproduced from the video tape will be stored in the buffer memory sequentially in correct orders without excess or deficiency. The contents of the buffer memory 5 will be transmitted in the order stored via the LAN interface 4, and the audio-video data transmitted will be erased from the buffe memory 5.

In the process of data reproduction mentioned above, the buffer usage rate is counted in the buffer memory 5 and is supplied to the tape driving controller 5. When the buffer usage rate is larger than the proper value, the tape driving controller 7 lowers the tape driving speed corresponding to the excess and time change rate. On the other hand, if the buffer usage rate is smaller than the proper value, the tape driving controller 7 raises the tape driving speed according to the deficiency and the time change rate thereof. More specifically, in the case where the data transmission speed in the network is low, the buffer usage rate tends to be bigger. Accordingly, delaying the data storage in the buffer memory 5 by decreasing the tape driving speed, the overall processing speed can be adjusted to the transmission speed of the network. On the other hand, when the data transmission speed in the network is fast, the buffer usage rate tends to be smaller. Therefore, increasing the data storage speed by increasing the tape driving speed, the overall processing speed can be adjusted to the data transmission speed of the network.

Figure 5:
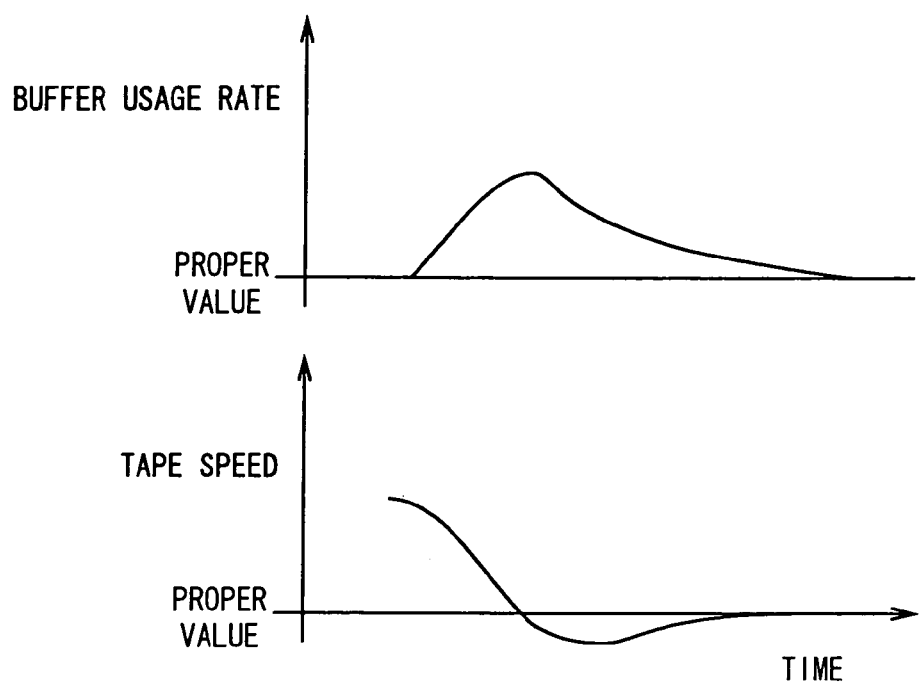
FIG. 5 is a conceptual diagram showing the relationship between the buffer usage rate and the tape speed in a reproduction mode according to the embodiment of the present invention.

FIG. 5 is a conceptual diagram showing the relationship between the buffer usage rate and the tape speed in the reproduction mode. As shown in this diagram, the buffer usage rate increases rapidly with the rise of the tape driving speed. The buffer usage rate can be kept properly by detecting said buffer usage rate and by controlling the feedback to decrease the tape driving speed. Thus, according to this embodiment, the audio-video data can be transmitted through automatic adjustment of the tape driving speed corresponding to the data transmission speed in the network without using any external storage device such as a hard disk device.

Next, the operation in the case of recording the data to be entered via the LAN interface 6 onto the video tape will be explained as follows. When recording the data on the video tape, contrary to the operation described above, the audio-video data transmitted via the LAN interface 6 are temporarily stored in the buffer memory 5. The audio-video data are transferred to the signal processing circuit 4 from the buffer memory 5 in units of GOP. In the signal processing circuit 4, the audio-video data are converted into signals recordable on the video tape, and then are recorded on the video tape to be driven at the predetermined tape driving speed by the tape driving device 3. In the case of recording on the video tape, the recording head should trace the recording tracks conforming to the format. Therefore, in the recording mode according to this embodiment, the video tape is driven at the standard speed.

At this point, if the transmission speed in the network is slow, the recording is done at a higher speed, so that the buffer usage rate becomes smaller than the proper value. Therefore, the tape driving controller 7 stops the tape driving temporarily, and then returns the tape by the fixed distance in the opposite direction so as to be ready for restarting the next recording. And when the buffer usage rate becomes larger than the proper value, the tape driving controller 7 resumes the tape driving and records the signal on the video tape.

Figure 6:
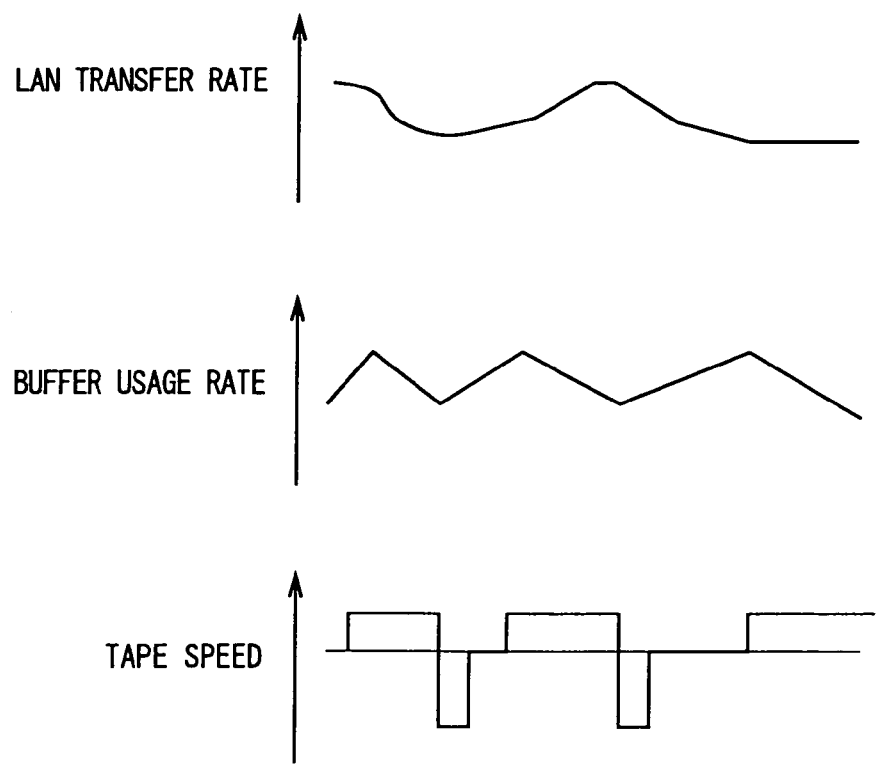
FIG. 6 is a conceptual diagram showing the relationship among the network transfer speed, the buffer usage rate and the tape speed in a recording mode according to the embodiment of the present invention.

FIG. 6 is a conceptual diagram showing the relationship among the transfer speed in the network, the buffer usage rate and the tape speed in the recording mode. If the transfer speed of the network is high, the buffer usage rate rapidly increases. When the buffer usage rate reaches to the fixed value, the video tape is moved and signals will be recorded. Thus, the buffer usage rate becomes low. And when the buffer usage rate is declined to the fixed value, the video tape is brought to a stop and after being returned by the fixed distance in the opposite direction, the tape is stopped to be ready for the next recording. The reason for making the tape run in the opposite direction for the fixed distance is that in consideration of the non-recording distance until a steady tape speed is attained. And when the buffer usage rate becomes the fixed value, the video tape is driven again to restart the recording after the steady speed is attained. Thus, according to this embodiment, the data can be recorded through the automatic adjustment of the tape running seed corresponding to the transmission speed of the network without using the external memory device such as a hard disk.

Furthermore, in the video tape recording/reproducing device, a list of recording contents of the video tape 8 is required in the case of transmitting the video data recorded on the video tape 8. However, since the video tape is a recording medium of sequential accessing, the whole video tape 8 should be reproduced in order to make a list, a considerable time is required for preparing such a list. According to this embodiment, the video tape 8 is equipped with a small capacity non-contact type buffer memory 9 (a drive circuit to control the buffer memory 9 is included in said buffer memory 9) and memorizes a list according to the recording contents of the video tape 8, and also equipped with a memory read/write circuit 10 to conduct the non-contact read/write to the buffer memory 9.

The list memorized in the buffer memory 9 is read out by the memory read/write circuit 10 when the tape driving device 3 reproduces the video tape 8 and outputted onto the network 11 via the LAN interface 6. With this arrangement, other terminals on the network can momentarily detect and refer to the recorded contents of the video tape 8 reproduced by the video tape recording/reproducing device. Moreover, when the tape driving device 3 records the video data transmitted from the network 11, the list information received from the LAN interface 6 is written in the buffer memory 9 by the memory read/write circuit 10 and the list of the buffer memory 8 will be updated. Thus, the list of the buffer memory 9 is constantly corresponded to the recording contents of the video tape 8.

According to the present invention, when the video data reproduced from the video tape being moved by the driving means are held temporarily in the buffer memory and sent out to the external equipment via the interface, or when the video data entered from the external equipment via the interface are held temporarily in the buffer memory and then recorded on the video tape moved by the driving means, the video tape running speed is controlled by the driving means in accordance with the data quantity stored in the buffer memory by the driving control means. As a result, the video data can be reproduced or recorded through automatic adjustment of the tape driving speed according to the transmission speed of the network without using any external memory device such as a hard disk. Consequently, an advantage in alleviating the specification requirements and diminishing the load on the network and the video server can be obtained.

Furthermore, according to the present invention, when the data quantity stored in the buffer memory is larger than the proper value, said driving control means decreases the video tape running speed. While, said driving control means increases the video tape driving speed when the data quantity stored in the buffer memory is smaller than the proper value. As a result, an advantage that the video data can be reproduced by automatically adjusting the tape driving speed according to the transmission speed of the network without using any external memory device such as hard disk device can be obtained.

According to the present invention, when the data quantity stored in the buffer memory drops lower than the proper value, the driving control means stops temporarily the running of the video tape. And when the data quantity stored in the buffer memory raises larger than the proper value, the driving control means resumes the motion of the video tape to restart the recording onto the video tape. As a result, an advantage that the video data can be recorded through automatic adjustment of the tape driving speed corresponding to the data transmission speed in the network without using the external memory device such as a hard disk can be obtained. Accordingly, an advantage in alleviating the specification requirements and diminishing the load on the network and the video server can be obtained.

Furthermore, according to the present invention, after the motion of the video tape is stopped temporarily, the video tape is returned by the fixed distance in the opposite direction by said driving control means to be ready for restarting the next recording. As a result, the video data recording can be restarted after the video tape running speed is stabilized.

Furthermore, according to the present invention, an advantage that the video data recorded on the video tape can be detected and referred without any reproduction/recording operation of the video tape by using the read/write means of the memory means attached to memorize the information for controlling the video data recorded on said video tape can be obtained.

INDUSTRIAL UTILIZATION

The video tape recorder according to the present invention can be used to the video server employed as an equipment of the broadcasting station.

The invention claimed is:

1. A video tape recording/reproducing device for recording video data on a video tape and reproducing the video data recorded on the video tape, comprising:
   driving means for driving the video tape at a predetermined running speed;
   a rotatable drum having a plurality of magnetic heads for executing reproduction and recording of the video data from/to the video tape;
   a buffer memory for temporarily holding the video data to be reproduced by said heads or the video data to be recorded, counting a rate of change of a current data quantity stored in the buffer memory to an entire memory capacity, and supplying the rate of change to a driving control means;
   an interface for asynchronously transmitting the video data between an external equipment and said buffer memory; and
   driving control means for controlling the running speed of said video tape by said driving means in accordance with the current data quantity stored in said buffer memory and the rate of change of the current data quantity stored in the buffer memory to the entire memory capacity, both supplied from the buffer memory,
   wherein a range of the running speed is a function of a fixed number of the plurality of heads;
   whereby the video data is recorded on the video tape in the form of multiple tracks;
   whereby the magnetic heads are arranged in pairs, the heads in each pair are spaced apart by about one track width, and the heads in each pair have about the same azimuth angle;
   whereby said device is operable to perform a variable speed reproduction in which all of the video data recorded on the video tape is reproduced by changing the tape running speed without changing the drum rotation speed; and
   whereby the video tape is housed within a cassette that includes a non-contact type buffer memory for storing a list of contents of the video tape, the non-contact type buffer memory including a drive circuit for controlling said memory, being read when data is reproduced from the tape and being written when data is recorded to the tape.

2. A video tape recording/reproducing device as defined in claim 1, wherein:
   said driving control means controls the running speed of said video tape; and
   said driving control means is controlled in such a manner that, when the data quantity stored in said buffer memory is larger than a predetermined value, the video tape running speed is lowered, while when the data quantity stored in said buffer memory is smaller than the predetermined value, the tape running speed is increased.

3. A video tape recording/reproducing device as defined in claim 1, wherein:
   said driving control means controls said driving means in such a manner that, when the data quantity stored in said buffer memory becomes lower than a predetermined value, the running of said video tape is suspended temporarily, while when the data quantity stored in said buffer memory becomes higher than the predetermined value, the motion of said video tape is started again in order to restart the recording on the video tape.

4. A video tape recording/reproducing device as defined in claim 3, wherein:
   said driving control means controls said driving means so that the video tape is returned by a fixed distance in the opposite direction to be ready for restarting the next recording after the running of said video tape is temporarily brought to a stop.

5. A video tape recording/reproducing device as defined in claim 1, comprising:
   memory write/read means for reading out the recorded contents of the memory means attached to said video tape in order to memorize the information to control the contents recorded on said video tape and for writing these.

6. A video tape reproducing device for reproducing the video data recorded on a video tape, comprising:
   driving means for driving said video tape at a predetermined running speed;
   a rotatable drum having a plurality of magnetic heads for executing reproduction of the video data from the video tape;
   buffer memory for temporarily holding the video data to be reproduced by said heads, counting a rate of change of a current data quantity stored in the buffer memory to an entire memory capacity, and supplying the rate of change to a driving control means;
   an interface for asynchronously transmitting the video data between an external equipment and said buffer memory; and driving control means for controlling the running speed of said video tape by said driving means corresponding to the current data quantity stored in said buffer memory and the rate of change of the current data quantity stored in the buffer memory to the entire memory capacity, both supplied from the buffer memory, wherein a range of the running speed is a function of a fixed number of the plurality of heads;

whereby the video data is recorded on the video tape in the form of multiple tracks;

whereby the magnetic heads are arranged in pairs, the heads in each pair are spaced apart by about one track width, and the heads in each pair have about the same azimuth angle;

whereby said device is operable to perform a variable speed reproduction in which all of the video data recorded on the video tape is reproduced by changing the tape running speed without changing the drum rotation speed; and whereby the video tape is housed within a cassette that includes a non-contact type buffer memory for storing a list of contents of the video tape, the non-contact type buffer memory including a drive circuit for controlling said memory, being read when data is reproduced from the tape and being written when data is recorded to the tape.

7. A video tape reproducing device as defined in claim 6, wherein:

said driving control means controls the running speed of a video tape by said driving means; and said driving control means controls said driving means such that when the data quantity stored in said buffer memory is larger than a predetermined value, the running speed of said video tape is decreased; and when the data quantity stored in said buffer memory is smaller than the predetermined value, the running speed of said video tape is increased.

8. A video tape reproducing device as defined in claim 6, comprising:

memory readout means for reading the recorded contents of the memory means attached to said video tape to memorize the information to control the contents recorded on said video tape.

* * * * *